(12) United States Patent
Kumar (10) Patent No.: US 8,511,449 B2
(45) Date of Patent: Aug. 20, 2013

(54) PROPULSION SYSTEM FOR A POWERED RAIL VEHICLE AND METHOD OF ADAPTING THE PROPULSION SYSTEM BETWEEN DIFFERENT CONFIGURATIONS

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 419 days.

(21) Appl. No.: 12/826,081

(22) Filed: Jun. 29, 2010

(65) Prior Publication Data

US 2011/0315043 A1    Dec. 29, 2011

(51) Int. Cl.
*B60L 9/00* (2006.01)

(52) U.S. Cl.
USPC .................................. 191/4; 105/35

(58) Field of Classification Search
USPC .................... 105/26.05, 35, 49, 61; 191/2–4; 307/10.1, 64
See application file for complete search history.

(56) References Cited

U.S. PATENT DOCUMENTS

| | | | | |
|---|---|---|---|---|
| 5,334,878 | A * | 8/1994 | Vanek et al. | 307/64 |
| 5,582,262 | A | 12/1996 | Wuest | |
| 6,864,598 | B2 * | 3/2005 | Nogaret et al. | 307/10.1 |
| 2002/0101081 | A1 | 8/2002 | Jockel | |
| 2005/0081739 | A1 | 4/2005 | Foesel | |
| 2005/0183623 | A1 | 8/2005 | Gritsch | |
| 2005/0279242 | A1 * | 12/2005 | Maier et al. | 105/26.05 |
| 2006/0005738 | A1 | 1/2006 | Kumar | |
| 2006/0283350 | A1 | 12/2006 | Kumar | |

FOREIGN PATENT DOCUMENTS

JP    8033122 A    2/1996

OTHER PUBLICATIONS

International Search Report issued in PCT/US2010/059195 on Apr. 19, 2011.

* cited by examiner

*Primary Examiner* — S. Joseph Morano
*Assistant Examiner* — Zachary Kuhfuss
(74) *Attorney, Agent, or Firm* — GE Global Patent Operation; John A. Kramer (57) ABSTRACT

A propulsion system for a powered rail vehicle includes a fuel engine, an alternator, and a tractive circuit. The alternator is coupled with and driven by the engine to produce a fuel-based electric current. The tractive circuit includes a conductive bus coupled with the alternator and a traction motor. The conductive bus is configured to couple with a power conditioning circuit to receive an external electric current from an external electric power source via the power conditioning circuit. The tractive circuit has a fuel-powered only configuration, a fuel- and electric-powered configuration, and an electric-powered only configuration. The tractive circuit supplies the traction motor with the fuel-based electric current in the fuel-powered only configuration, with the fuel-based electric current or the external electric current in the fuel- or electric-powered configuration, and with the external electric current in the electric-powered only configuration.

19 Claims, 5 Drawing Sheets

ABSTRACT

PROPULSION SYSTEM FOR A POWERED RAIL VEHICLE AND METHOD OF ADAPTING THE PROPULSION SYSTEM BETWEEN DIFFERENT CONFIGURATIONS

BACKGROUND OF THE INVENTION

The subject matter described herein relates generally to powered rail vehicles.

Known railway systems include powered rail vehicles that travel along one or more rails of a track. The powered rail vehicles include motors that provide the tractive effort that propels the rail vehicles along the track. In one mode of operation, the motors are powered by electric current. In some known rail vehicles, the electric current is obtained from an on-board prime mover. For example, the electric current may be created by an alternator or generator that is coupled to a shaft of an engine. The engine consumes a fuel, such as diesel fuel, gas fuel, and the like, to generate movement of the shaft. The movement of the shaft is converted into electrical current by the alternator or generator. This current is fed to the motor to propel the rail vehicle along the track.

In some other known powered rail vehicles, the rail vehicles are electrified rail vehicles that receive electric current from an external source located outside of the rail vehicle. For example, the rail vehicles may be electrified locomotives that receive electric current from a catenary wire located above the track or from an electrified rail near the track. The electric current is received from the catenary or electrified rail and is supplied to the motor. The motor is powered by the current to propel the rail vehicle along the track.

Electrified rail vehicles have advantages over rail vehicles with on-board prime movers. For example, the electrified rail vehicles may have a higher power-to-weight ratio than rail vehicles with on-board prime movers. The electrified rail vehicles may be capable of faster acceleration and greater tractive effort on relatively steep grades than other rail vehicles. Electrified rail vehicles may produce less exhaust fumes and carbon emissions and produce less acoustic noise than other rail vehicles, such as rail vehicles powered by diesel engines. Additionally, electrified rail vehicles may be able to create regenerative current when the rail vehicles brake, which can be supplied back to a utility power grid.

A significant amount of the total length of tracks in various countries is not electrified. For example, many tracks may not include a catenary or electrified rail to power electrified rail vehicles. As a result, most of the tracks are traveled only by rail vehicles having on-board prime movers. Due to the benefits achieved with electrified rail vehicles, there is considerable interest in transitioning more tracks and rail vehicles to electrified tracks and electrified rail vehicles. The cost of converting the tracks to enable electrified rail vehicles to travel thereon is considerable. As a result, the transition of a track from a non-electrified track to an electrified track can be very expensive and slow. In some locations, only portions of the tracks are capable of handling electrified rail vehicles while other portions are incapable of supplying current to the electrified rail vehicles. While there currently is significant interest in converting more of the tracks to tracks capable of providing current to the electrified rail vehicles, given the large expense and time involved in converting the tracks, it is difficult to know when a given length of track will be capable of handling electrified rail vehicles. As a result, some known rail vehicles are limited as to which portions of the tracks that the rail vehicles may travel on.

A need exists for rail vehicles that are capable of migrating or adapting from a configuration where the rail vehicles travel along non-electrified tracks to a configuration where the rail vehicles are capable of travelling along electrified tracks.

BRIEF DESCRIPTION OF THE INVENTION

In one embodiment, a propulsion system of a powered rail vehicle is provided. The rail vehicle includes a fuel engine (meaning a device that combusts or otherwise converts diesel, gasoline, or another fuel into mechanical movement of an output shaft or other mechanical driver), an alternator, and a tractive circuit. The engine is disposed in the powered rail vehicle. The alternator is coupled with and driven by the engine to produce a fuel-based electric current. ("Fuel-based" electric current means an electric current generated by combusting fuel or otherwise converting fuel into mechanical energy in a fuel engine.) The tractive circuit includes a conductive bus coupled with the alternator and a traction motor. The conductive bus is configured to couple with a power conditioning circuit to receive an external electric current from an external electric power source via the power conditioning circuit. ("External" means off-board the rail vehicle, and, if the rail vehicle comprises or is part of a consist, off-board the consist.) The tractive circuit has a fuel-powered only configuration, a fuel- and electric-powered configuration, and an electric-powered only configuration. The tractive circuit supplies the traction motor with the fuel-based electric current in the fuel-powered only configuration, with the fuel-based electric current or the external electric current in the fuel- and electric-powered configuration, and with the external electric current in the electric-powered only configuration.

In another embodiment, a method for adapting a propulsion system for a powered rail vehicle between different configurations is provided. The method includes providing a tractive circuit that electrically couples a traction motor of the powered rail vehicle with an alternator that is coupled to and driven by a fuel engine of the powered rail vehicle in a fuel-powered only configuration. The alternator supplies a fuel-based electric current to the tractive circuit. The method also includes adapting the propulsion system from the fuel-powered only configuration to a fuel- and electric-powered configuration by coupling the tractive circuit with a power conditioning circuit that is configured to couple with an external electric power source. The power conditioning circuit supplies an external electric current from the external electric power source to the tractive circuit. The method further includes powering the traction motor with the fuel-based electric current from the alternator in the fuel-powered only configuration of the powered rail vehicle and with the external electric current from the external electric power source in the fuel- and electric-powered configuration of the propulsion system.

In another embodiment, a propulsion system for a powered rail vehicle that has different configurations to power a traction motor of the powered rail vehicle is provided. The propulsion system includes a fuel engine, an alternator, and a conductive bus. The engine is disposed in the powered rail vehicle. The alternator is coupled with and driven by the engine to produce a fuel-based electric current. The conductive bus is coupled with the alternator and is configured to couple with a power conditioning circuit to receive an external electric current from an external electric power source via the power conditioning circuit. The conductive bus supplies the fuel-based electric current or the external electric current to the traction motor to propel the powered rail vehicle along a track.

DETAILED DESCRIPTION OF THE INVENTION

The foregoing summary, as well as the following detailed description of certain embodiments of the presently described subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It should be noted that although one or more embodiments may be described in connection with powered rail vehicle systems having locomotives with trailing passenger cars, the embodiments described herein are not limited to passenger trains or other trains. In particular, one or more embodiments may be implemented in connection with different types of rail vehicles and other vehicles. For example, one or more embodiments may be implemented with a vehicle that travels on one or more rails, such as single locomotives and railcars, powered ore carts and other mining vehicles, light rail transit vehicles, and the like. Example embodiments of propulsion systems, powered rail vehicles, and methods for migrating propulsion systems of rail vehicles from a fuel-powered only configuration to an electric-powered only configuration are provided. At least one technical effect described herein includes a propulsion system and a rail vehicle that are capable of being adapted from propelling the rail vehicle using all fuel-powered propulsion systems (such as diesel engines) to propelling the rail vehicle using a combination of fuel- and electric-powered propulsion systems, to propelling the rail vehicle using all electric-powered propulsion systems.

The rail vehicle may be manufactured in a configuration that uses all fuel-powered propulsion systems but that includes components that allow the rail vehicle to be upgraded or modified to a rail vehicle that uses a combination of fuel- and electric-powered propulsion systems and/or to a rail vehicle that uses all electric-powered propulsion systems. For example, the rail vehicle may be initially manufactured with components that permit the source of propulsion for the rail vehicle to be adapted or changed at some future point in time. The components that are included in the rail vehicle to allow the rail vehicle to be adapted may be provided at relatively low cost and/or may not significantly add to the weight of the rail vehicle.

Figure 1:
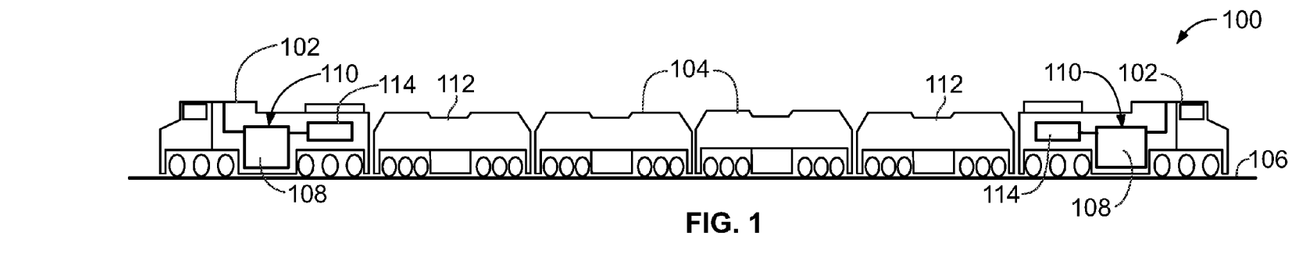
FIG. 1 is a diagram of a powered rail vehicle in a fuel-powered only configuration in accordance with one embodiment.

FIG. 1 is a diagram of a powered rail vehicle 100 in a fuel-powered only configuration in accordance with one embodiment. The rail vehicle 100 includes one or more powered units 102 coupled with several trailing units 104, 112 that travel along one or more rails of a track 106. In the illustrated embodiment, the rail vehicle 100 is a distributed power rail vehicle that includes two powered units 102 facing opposite directions. For example, the powered units 102 may be locomotives disposed at the front and back ends of the rail vehicle 100. Alternatively, more than one powered unit 102 may be provided at the front and/or back end, or between the front and back end of the rail vehicle 100. The trailing units 104, 112 may be passenger cars for carrying passengers and/or storage units or load units for carrying goods along the track 106. In the embodiment shown in FIG. 1, the trailing units 112 are directly coupled to the powered units 102 while the trailing units 104 are interconnected with the powered units 102 by the trailing units 112 but are not directly coupled with the powered units 102.

The rail vehicle 100 is adapted to migrate between different configurations to change the source of power that is used to propel the rail vehicle 100 along the track 106. The different configurations of the rail vehicle 100 relate to the different states or configurations of a propulsion system 110 that propels the rail vehicle 100 along the track 106. In the embodiment shown in FIG. 1, the rail vehicle 100 and propulsion system 110 are in a fuel-powered only configuration with the propulsion system 110 including an on-board prime mover that consumes fuel in order to propel the rail vehicle 100. (The terms "engine" or "fuel engine" and "prime mover" are used interchangeably herein to refer to a device that combusts or otherwise converts diesel, gasoline, or another fuel into mechanical movement of an output shaft or other mechanical driver.)

In the fuel-powered only configuration, the propulsion system 110 includes a fuel engine 108 that generates fuel-based electric current based on consumption of an on-board fuel. For example, the engines 108 may be engines that consume a combustible fuel, such as diesel fuel, hydrogen, water/steam, gas, and the like, in order to generate movement. The engines 108 are coupled with alternators that create electric current based on movement of the engines 108. The term "alternator" may refer generally to a device for converting mechanical energy, such as produced by an output shaft of the engine 108, to electrical energy. The electric current is supplied to a tractive circuit 114 of the propulsion system 110. The tractive circuit 114 includes traction motors that are powered by the current to propel the rail vehicle 100 along the track 106. The fuel that is consumed by the engines 108 can be stored on the rail vehicle 100 and travel along the track 106 with the rail vehicle 100. For example, the diesel fuel, gas, hydrogen, water, or other type of fuel that is consumed by the engines 108 to operate may be stored on the rail vehicle 100 and move along the track 106 with the rail vehicle 100. The fuel may be referred to herein as "on-board fuel."

Figure 2:
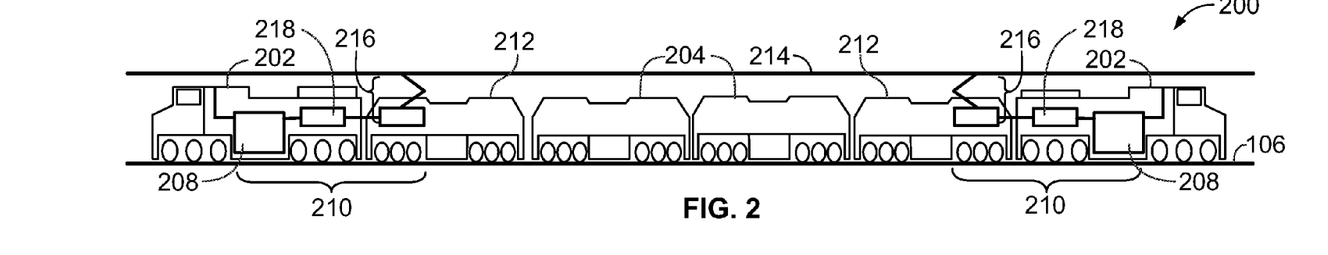
FIG. 2 is a diagram of a powered rail vehicle in a combination fuel- and electric-powered configuration in accordance with one embodiment.

FIG. 2 is a diagram of a powered rail vehicle 200 in a combination fuel- and electric-powered configuration in accordance with one embodiment. The rail vehicle 200 may be the same rail vehicle 100 shown in FIG. 1 with modifications made to the powered units 102 (shown in FIG. 1), the trailing units 112 (shown in FIG. 1), and/or the propulsion systems 110 (shown in FIG. 1). For example, the rail vehicle 200 may include propulsion systems 210 that are modified versions of the propulsion system 110 while other components of the rail vehicle 200 remain substantially the same as the rail vehicle 100. Alternatively, the rail vehicle 200 may be separately manufactured from the rail vehicle 100 and not be created as a modification of the existing components of the rail vehicle 100. While two propulsion systems 210 are shown, the rail vehicle 200 may include a different number of propulsion systems 210.

The rail vehicle 200 includes powered units 202 and trailing units 204 that may be similar to the powered units 102 (shown in FIG. 1) and trailing units 104 (shown in FIG. 1) of the rail vehicle 100 (shown in FIG. 1). The rail vehicle 200 includes trailing units 212 that are coupled with the powered units 202. In the illustrated embodiment, the trailing units 212 may be similar to the trailing units 112 (shown in FIG. 1) of the rail vehicle 100 with at least one difference being that at least a portion of the propulsion system 210 is disposed in the trailing units 212. For example, while the propulsion system 110 (shown in FIG. 1) of the rail vehicle 100 may be entirely disposed within the powered units 102, at least a portion of the propulsion system 210 may be disposed in the powered units 202 with another portion of the propulsion system 210 located in the trailing units 212 that are coupled with the powered units 202.

The propulsion system 210 is configured to provide tractive power to the rail vehicle 200 based on fuel and/or external electric power. For example, the propulsion system 210 may include fuel engines 208 that operate based on the consumption of diesel fuel, gas, hydrogen, and the like. The engines 208 may be similar to the engines 108 (shown in FIG. 1). For example, the engines 208 may be diesel engines, gas turbine engines, hydrogen engines, and the like. The engines 208 are coupled with alternators 400 (shown in FIG. 4) that create fuel-based electric current based on movement of the engines 208. The fuel-based electric current is supplied to a tractive circuit 218 in a manner similar to the electric current being supplied to the tractive circuit 114 (shown in FIG. 1). The traction motors 412 of the tractive circuit 218 receive the current and propel the rail vehicle 200.

The propulsion system 210 also includes a power conditioning circuit 216 that is electrically coupled with the tractive circuit 218. The power conditioning circuit 216 may receive external electric current from an external electric power source to power the traction motors 412 (shown in FIG. 4) of the rail vehicle 200. By way of example only, the external electric power source may be a conductive pathway 214 that extends along the track 106 and supplies electric current to power the traction motors 412 of the rail vehicle 200. The conductive pathway 214 includes one or more conductive members that electrically couple with the propulsion systems 210 using the power conditioning circuits 216 to provide electric current to the propulsion systems 210. By way of example only, the conductive pathway 214 may be an overhead catenary wire that extends above the rail vehicle 200 along the track 106 and/or an electrified rail near or adjacent to the track 106. The conductive pathway 214 may supply current from a utility power grid.

During a trip along the track 106, the rail vehicle 200 may switch between powering the traction motors 412 (shown in FIG. 4) with fuel-based electric current and external electric current. For example, when no conductive pathway 214 is available or the conductive pathway 214 is unable to supply electric current to the propulsion systems 210, the propulsion systems 210 may propel the rail vehicle 200 using fuel-based electric current that is generated based on movement of the engines 208. When the conductive pathway 214 is available to supply external electric current to the rail vehicle 200, the propulsion systems 210 may propel the rail vehicle 200 using external electric current received from the conductive pathway 214. If the conductive pathway 214 or engines 208 are unable to supply sufficient electric current to propel the rail vehicle 200, both the conductive pathway 214 and the engines 208 may be used to supply electric current that propels the rail vehicle 200. For example, the fuel-based electric current generated based on movement of the engine 208 may augment the external electric current received from the power conditioning circuit 216, and vice-versa.

In one embodiment, the rail vehicle 200 may transmit electric current generated based on movement of the engines 208 to a utility power grid that is electrically coupled with the conductive pathway 214. For example, if the cost of generating electric current based on movement of the engines 208 is less than the cost of obtaining electric current from the utility power grid, the rail vehicle 200 may generate electric current and supply the electric current back to the utility power grid. Some utility power companies may provide financial incentives for electric energy that is provided to the utility power grids. The electric current generated by the engines 208 may be used to obtain these incentives while propelling the rail vehicle 200 using electric current from the utility power grid.

Figure 3:
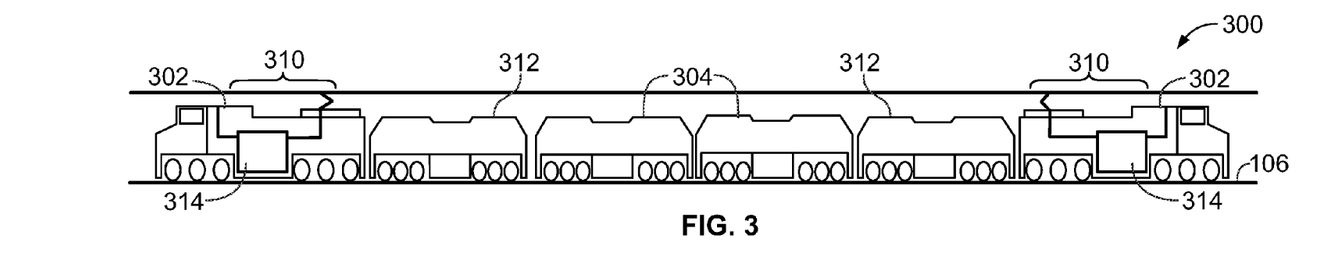
FIG. 3 is a diagram of a powered rail vehicle in an electric-powered only configuration in accordance with one embodiment.

FIG. 3 is a diagram of a powered rail vehicle 300 in an electric-powered only configuration in accordance with one embodiment. The rail vehicle 300 may be the same rail vehicle 200 shown in FIG. 2 with modifications made to the propulsion systems 210 (shown in FIG. 2). Alternatively, the rail vehicle 300 may be separately manufactured from the rail vehicle 200 and not be created as a modification of the existing components of the rail vehicle 200. While two propulsion systems 310 are shown, the rail vehicle 300 may include a different number of propulsion systems 310.

The rail vehicle 300 includes powered units 302 and trailing units 304, 312. The trailing units 304, 312 may be similar to the trailing units 104, 112 (shown in FIG. 1) of the rail vehicle 100 (shown in FIG. 1). In the illustrated embodiment, the propulsion systems 310 are disposed in the powered units 302. The propulsion systems 310 are configured to provide tractive power to the rail vehicle 300 based on external electric current received from the conductive pathway 214. The propulsion systems 310 may not include engines 108, 208 (shown in FIGS. 1 and 2) that propel rail vehicles 100, 200 (shown in FIGS. 1 and 2) based on the consumption of an on-board fuel. For example, the propulsion systems 310 may include tractive circuits 314 that include the traction motors 412 (shown in FIG. 4). The tractive circuits 314 receive electric current to power the traction motors 412 from the conductive pathway 214 and not from movement of an engine 108, 208, in one embodiment.

Figure 4:
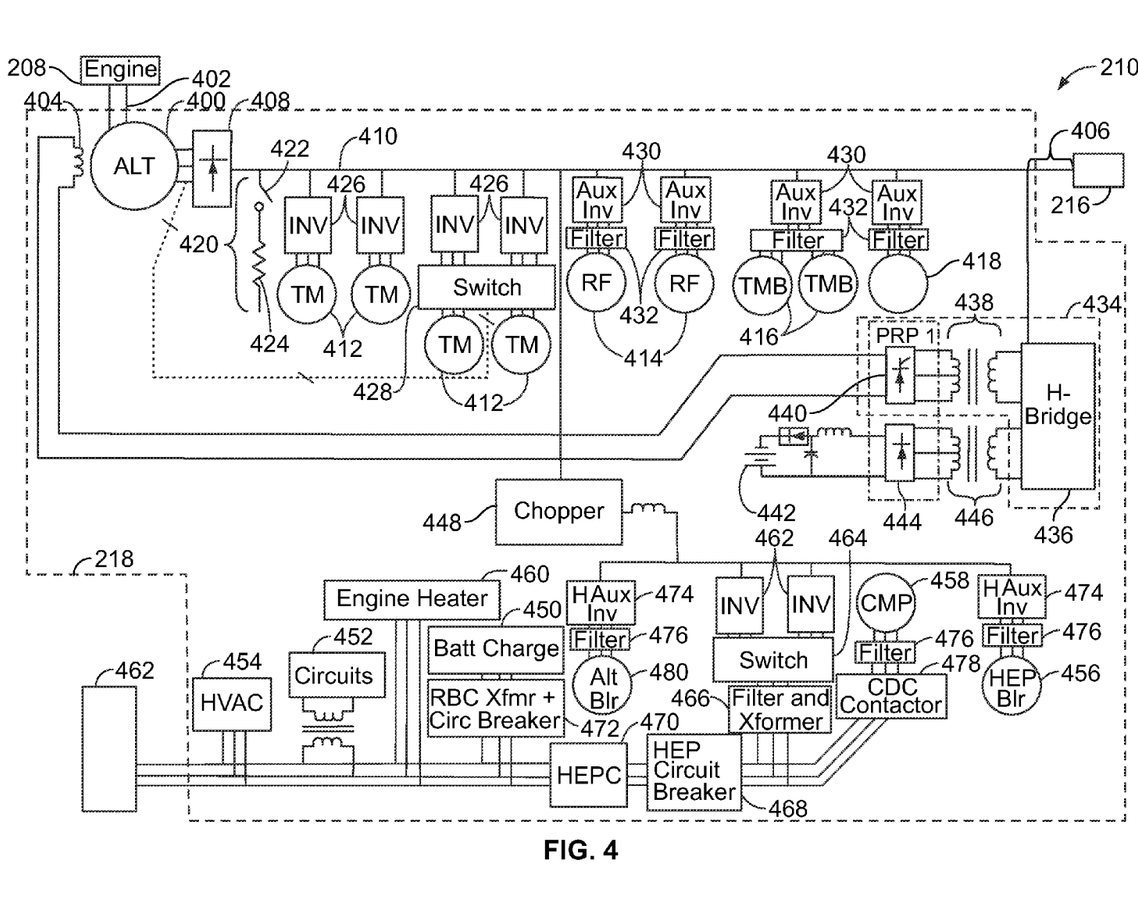
FIG. 4 is a diagram of a tractive circuit of a propulsion system shown in FIG. 2 in accordance with one embodiment.
Figure 5:
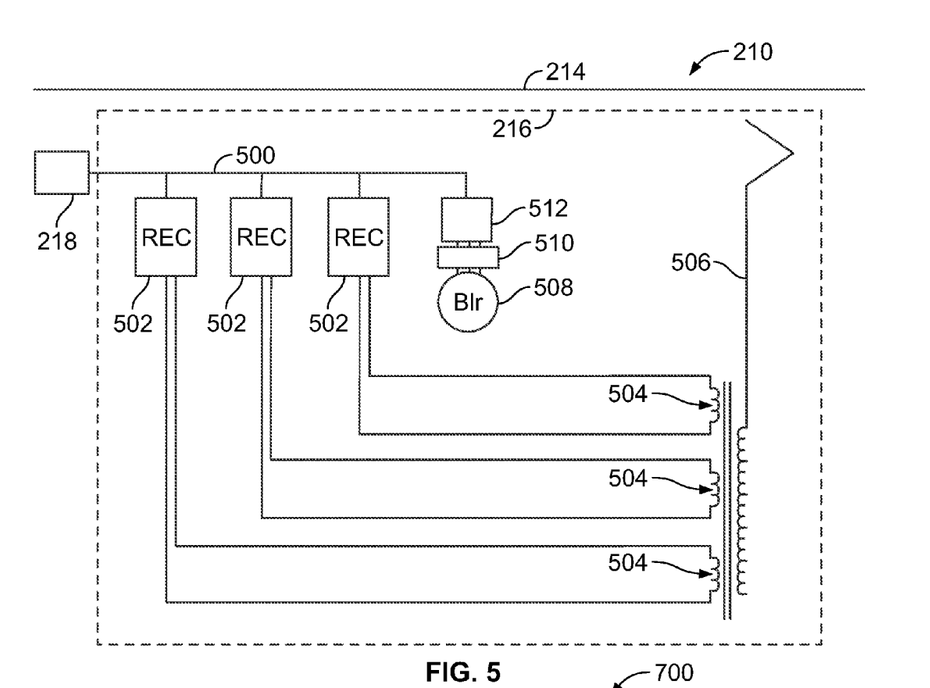
FIG. 5 is a diagram of a power conditioning circuit of the propulsion system shown in FIG. 2 in accordance with one embodiment.

FIGS. 4 and 5 are diagrams of the propulsion system 210 in the fuel- and electric-powered configuration in accordance with one embodiment. FIG. 4 illustrates the tractive circuit 218 of the rail vehicle 200 (shown in FIG. 2) and FIG. 5 illustrates the power conditioning circuit 216 of the rail vehicle 200. With respect to FIG. 4, while the discussion herein focuses on the tractive circuit 218 of the rail vehicle 200, the description of the tractive circuit 218 may also apply to the tractive circuit 114 (shown in FIG. 1) of the rail vehicle 100 (shown in FIG. 1). For example, the tractive circuit 218 may be similar to the tractive circuit 114 with one difference being a bus extension 406 of the tractive circuit 218. The tractive circuit 218 may include the bus extension 406 while the tractive circuit 114 does not include the bus extension 406. As described below, the bus extension 406 can be used to couple the tractive circuit 218 with the power conditioning circuit 216.

The propulsion system 210 includes the engine 208 coupled to the alternator 400 of the tractive circuit 218. The alternator 400 may be coupled with an output shaft 402 of the engine 208. A rotor (not shown) of the alternator 400 is coupled with the output shaft 402. The engine 208 rotates the output shaft 402 and the rotor near field windings 404 of the alternator 400. The field windings 404 generate a magnetic field through which the rotor rotates based on movement of the output shaft 402. In the illustrated embodiment, movement of the rotor within the magnetic field creates an alternating electric current that is output by the alternator 400.

The electric current is output from the alternator 400 may be a three phase alternating current. The current is supplied to a rectifier 408. The rectifier 408 converts the current output from the alternator 400 to a direct electric current that is conveyed through the tractive circuit 218 along a conductive bus 410. The bus 410 includes one or more interconnected and electrically conductive pathways coupled with each other that supply electric current to various electric loads of the tractive circuit 218. The electric loads may include propulsion electric loads that propel or assist in propelling the rail vehicle 200 (shown in FIG. 2). In the illustrated embodiment, the propulsion electric loads include the traction motors 412 ("TM"), fans 414 ("RF"), motor blowers 416 ("TMB"), and other electric loads 418. The propulsion electric loads of the tractive circuit 218 described herein are not intended to be all encompassing or exclusive, as additional components may be included.

The tractive circuit 218 includes one or more grid resistor legs 420. The grid resistor legs 420 consume energy that is created when the rail vehicle 200 (shown in FIG. 2) brakes or slows down. For example, the brakes of the rail vehicle 200 may be regenerative brakes that create electric current when the rail vehicle 200 slows down. This current may be referred to as regenerated current. At least some of the regenerated current may be directed to the conductive pathway 214 by way of the power conditioning circuit 216 while some of the regenerated current may be directed to the grid resistor legs 420 where the current is converted into another energy form, such as heat. While only one grid resistor leg 420 is shown, the tractive circuit 218 may include several grid resistor legs 420, such as four or more grid resistor legs 420. The grid resistor leg 420 includes a switch 422 and a resistive element 424. The switch 422 may be controlled to alternate between open and closed states to electrically couple and decouple, respectively, the resistive element 424 with the bus 410.

Inverters 426 ("INV") are coupled to the bus 410 between the bus 410 and the traction motors 412. The inverters 426 convert the direct electric current of the bus 410 into an alternating current that is supplied to the traction motors 412. A crank transfer switch 428 ("Switch") may be disposed between the inverters 426 and one or more traction motors 412 to control the supply of current to the traction motors 412 during motoring and to supply the alternator 400 with current during engine cranking.

Auxiliary inverters 430 ("Aux Inv") are coupled to the bus 410 between the bus 410 and filters 432. Auxiliary inverters 430 also may be disposed between the bus 410 and one or more other electric loads 418. The auxiliary inverters 430 convert the direct current of the bus 410 into an alternating current that is delivered to the filters 432. The filters 432 reduce current that does not have a predetermined frequency or a frequency that falls outside a predetermined range of frequencies. For example, the filters 432 may filter out non-60 Hz components or harmonics of the alternating current that is output from the inverters 430. The alternating current that is output from the filters 432 is delivered to the fans 414, the traction motor blowers 416, and/or other electric loads 418. The fans 414 may include radiator fans that blow air in the powered unit 202 (shown in FIG. 2). For example, the fans 414 may circulate air to cool a radiator or other component of the engine 208. The traction motor blowers 416 circulate air about or around the traction motors 412 to cool the traction motors 412.

The bus 410 is coupled with a field control component 434. The field control component 434 is disposed between the field windings 404 of the alternator 400 and the propulsion electric loads of the tractive circuit 218. In the illustrated embodiment, the field control component 434 includes an H-bridge 436, a transformer 438, and a phase control rectifier 440 ("PRP1"). The field control component 434 controls the field current that is supplied to the field windings 404 of the alternator 400.

In the illustrated embodiment, a battery 442 may be coupled with the field control component 434 and another phase control rectifier 444. The phase control rectifier 444 is coupled with the H-bridge 436 by a transformer 446. The battery 442 may receive and store electric current as a backup or emergency storage of electric power. The battery 442 also may deliver electric current through the tractive circuit 218 when the alternator 400 does not generate current. For example, the battery 442 may supply electric current when the engine 208 is turned off or deactivated.

A chopper 448 may be coupled with the bus 410 and receives the direct current on the bus 410. The chopper 448 may increase or decrease the voltage on the bus 410 prior to supplying the voltage to one or more non-propulsion electric loads of the tractive circuit 218. For example, the chopper 448 may step up or step down the voltage on the bus 410 prior to supplying the voltage to the non-propulsion electric loads. The non-propulsion electric loads may be components that receive electric current to provide functions that do not directly propel the rail vehicle 200 (shown in FIG. 2) along the track 106 (shown in FIG. 1). Some of the non-propulsion electric loads may be disposed in the powered units 202 (shown in FIG. 2). In the illustrated embodiment, the non-propulsion electric loads that are disposed in the powered units 202 include a battery charger 450 ("Redundant Batt Charge"), electric circuits 452, a heating, ventilation, and air cooling ("HVAC") subsystem 454, blowers 456, 480 ("HEP Blr" and "Alt Blr"), compressors 458 ("CMP"), and engine heaters or other layover protection equipment 460 ("Engine Heater"). Similar or different non-propulsion electric loads may be included in one or more of the trailing units 212, 204 (shown in FIG. 2). Alternatively, different non-propulsion electric loads than those shown in FIG. 4 may be provided.

In another embodiment, the chopper 448 is not provided. For example, the output of the chopper 448 shown in FIG. 4 may be coupled with and receive electric current that is created by the alternator 400. The electric current may be provided from the alternator 400 to the non-propulsion electric loads without passing through the chopper 448.

In the illustrated embodiment, inverters 462 ("INV"), a switch 464, and a filter and transformer combination 466 ("Filter and Xformer") couple the non-propulsion electric loads with the chopper 448. The inverters 462 may convert a direct current output from the chopper 448 with an alternating current that is fed to the switch 464. The switch 464 alternates between closed and open positions to alternatively couple and decouple the inverters 462 with the non-propulsion electric loads. For example, the switch 464 may couple both inverters 462 in order to supply sufficient alternating current to the non-propulsion electric loads. Multiple inverters 462 may be used in order to provide a backup or failsafe system. For example, if one inverter 462 fails, at least one additional inverter 462 may be available to supply the alternating current to one or more of the non-propulsion electric loads. The filter and transformer combination 466 may filter out portions of the unwanted frequencies that are supplied to the non-propulsion electric loads and/or change the voltage of the current.

A circuit breaker 468 ("HEP Circuit Breaker") is coupled to the filter and transformer combination 466. The circuit breaker 468 may include fuses that provide safeguards against overloading one or more components that are joined with the circuit breaker 468. For example, the circuit breaker 468 may include fuses that protect the battery charger 450, engine heater 460, circuits 452, HVAC subsystem 454, trailing unit non-propulsion loads 462, and the like, from voltage and/or current spikes. A contactor 470 ("HEPC") is located downstream from the circuit breaker 468 in the illustrated embodiment. The contactor 470 may be an electronically controlled switch or relay disposed between the circuit breaker 468 and one or more of the non-propulsion electric loads. Similar to the switch 464, the contactor 470 may alternate between closed and open positions to alternatively deliver and prevent delivery of current to one or more of the non-propulsion electric loads, such as the battery charger 450, engine heater 460, circuits 452, HVAC subsystem 454, and the like.

The battery charger 450 may be an alternate or backup source of power for the non-propulsion electric loads. In one embodiment, an external source of power may be used to supply current to the battery charger 450 when the engine 208 is turned off or is not moving. The battery charger 450 may be coupled with a transformer 472 ("RBC XFmr+Circ Breaker") that increases or decreases the voltage supplied to and/or received from the battery charger 450. The transformer 472 provides electrical isolation of the tractive circuit 218 from the external source of power when the battery is being charged by the battery charger 450. The HVAC subsystem 454 provides ventilation to the powered unit 202 (shown in FIG. 2). Additional HVAC subsystems 454 may be provided in the trailing units 204, 212 (shown in FIG. 2).

The electric circuits 452 may represent one or more circuits that supply current to the powered unit 202 (shown in FIG. 2). Additional electric circuits 452 may be included in the trailing units 204, 212 (shown in FIG. 2). For example, the circuits 452 may deliver current to electrical outlets and other interfaces that permit passengers to receive the current for devices of the passengers, such as electric razors, computers, and the like.

The trailing unit non-propulsion loads 462 include non-propulsion electric loads disposed in one or more of the trailing units 204, 212. By way of example only, the trailing unit non-propulsion loads 462 may include one or more heating, ventilation, and air cooling (HVAC) subsystems, lights, electric circuits for passenger use, and the like.

The blowers 456, 480 are coupled with the chopper 448 by inverters 474, 482 ("HAux Inv") and filters 476. The blowers 456, 480 may include fans that move air to cool devices, such as the inverters 462, filters 476, the field control component 434, and the like. The compressor 458 may be an air compressor for a supplying compressed air for a braking system in the powered unit 202 (shown in FIG. 2) and/or the trailing units 204, 212 (shown in FIG. 2). The compressor 458 may be coupled with the filter and transformer combination 466 by a filter 476 and a contactor 478 ("CDC Contactor"). The contactor 478 may be a switch that allows the compressor 458 to be coupled and decoupled from the filter and transformer combination 466.

The tractive circuit 218 described above may be similar to the tractive circuit 114 (shown in FIG. 1) of the rail vehicle 100 (shown in FIG. 1). For example, the tractive circuit 218 may be provided in the powered unit 102 (shown in FIG. 1) and coupled with the engine 108 (shown in FIG. 1). In the illustrated embodiment, the tractive circuit 114 may be modified to the tractive circuit 218 by adding the bus extension 406. For example, the tractive circuit 114 may be the same as the tractive circuit 218 with the bus extension 406 removed. The tractive circuit 114 is modified to the tractive circuit 218 by adding the bus extension 406 to the bus 410 in one embodiment.

The bus extension 406 is a conductive pathway that is electrically coupled with the bus 410. The bus extension 406 may include a cable that includes conductive wires. The bus extension 406 may extend out of the back of the powered unit 202 (shown in FIG. 2) to the trailing unit 212 (shown in FIG. 2). The bus extension 406 is coupled with the power conditioning circuit 216 such that current may be conveyed from the power conditioning circuit 216 to the bus 410 of the tractive circuit 218 along the bus extension 406.

FIG. 5 illustrates the power conditioning circuit 216 in accordance with one embodiment. The power conditioning circuit 216 includes a conductive bus 500 that is coupled with the bus extension 406 (shown in FIG. 4) of the tractive circuit 218 to electrically couple the power conditioning circuit 216 with the tractive circuit 218. For example, the bus extension 406 and/or the conductive bus 500 may include a connector (not shown) that electrically couples the bus extension 406 with the bus 500 of the power conditioning circuit 216. Alternatively, the bus extension 406 and the bus 500 may be integrally formed with each other or otherwise electrically coupled with each other.

In the illustrated embodiment, several rectifiers 502 ("REC") are coupled with the bus 500. The rectifiers 502 couple several transformers 504 with the bus 500. While three rectifiers 502 and three transformers 504 are shown, alternatively a different number of rectifiers 502 and/or transformers 504 may be provided. The transformers 504 are inductively coupled with a conductive extension 506 of the power conditioning circuit 216.

The conductive extension 506 includes a conductive body that extends outside of the trailing unit 212 (shown in FIG. 2) to obtain electric current from the conductive pathway 214. For example, the conductive extension 506 may include one or more of a pantograph device, a bow collector, trolley pole, a brush, and the like, that receives electric current from an overhead catenary line. In another example, the conductive extension 506 may include a contact shoe that receives electric current from an electrified rail of the track 106 (shown in FIG. 1). The conductive extension 506 engages the conductive pathway 214 to receive electric current conveyed along the conductive pathway 214.

In operation, the conductive extension 506 receives external electric current from the conductive pathway 214. The current is inductively transferred across the transformers 504 to the rectifiers 502. The transformers 504 may increase or decrease the voltage received from the conductive pathway 214. The rectifiers 502 convert alternating current received from the conductive pathway 214 to a direct current. Some of the direct current may be supplied along the bus 500 to a blower 508 ("Blr"). For example, the blower 508 may be coupled with the bus 500 by a filter 510 and a switch 512. The blower 508 may move air to cool the rectifiers 502. The current that is output from the rectifiers 502 (the external electric current) is conveyed along the bus 500 to the tractive circuit 218. The current may be conveyed along the bus 410 (shown in FIG. 4) of the tractive circuit 218 in order to power the electric loads of the tractive circuit 218. For example, the current from the power conditioning circuit 216 may power the traction motors 412 (shown in FIG. 4).

In one embodiment, if the conductive pathway 214 supplies direct electric current to the power conditioning circuit 216, then the power conditioning circuit 216 may include one or more choppers (not shown) that increase or decrease the voltage of the direct electric current. The choppers may step up or step down the voltage prior to supplying the direct electric current to the bus 410 (shown in FIG. 4) of the tractive circuit 218.

The propulsion system 210 shown in FIGS. 4 and 5 may alternate between different sources of electric current for the electric loads of the tractive circuit 218. For example, the bus 410 of the tractive circuit 218 may switch between supplying fuel-based electric current to the traction motors 412 from the alternator 400 and supplying external electric current to the traction motors 412 from the conductive pathway 214 based on an availability of electric current conveyed along the conductive pathway 214. The tractive circuit 218 and the power conditioning circuit 216 may remain electrically coupled regardless of whether the traction motors 412 are powered by current from the alternator 400 or power conditioning circuit 216. As shown in FIGS. 4 and 5, the bus 410 of the tractive circuit 218 may concurrently couple the alternator 400 and the power conditioning circuit 216 with the traction motors 412. By way of example only, during stretches of the track 106 (shown in FIG. 1) where no conductive pathway 214 is present or the conductive pathway 214 is not supplying electric current to the propulsion system 210, the tractive circuit 218 may receive fuel-based electric current from the alternator 400 and power the traction motors 412 using the fuel-based electric current. When the rail vehicle 200 (shown in FIG. 2) arrives at a portion of the track 106 that includes the conductive pathway 214, the conductive extension 506 may engage the conductive pathway 214 to receive the external electric current from the conductive pathway 214. The external electric current is fed to the tractive circuit 218 by the power conditioning circuit 216 to power the traction motors 412. In one embodiment, the tractive circuit 218 may receive electric current from both the conductive pathway 214 and the alternator 400. For example, the traction motors 412 may be concurrently powered by fuel-based electric current received from the alternator 400 and external electric current received from the conductive pathway 214.

In one embodiment, the propulsion system 210 may supply electric current to a utility power grid by way of the power conditioning circuit 216. As described above, the power conditioning circuit 216 may be electrically coupled with the conductive pathway 214. The conductive pathway 214 may be electrically coupled with the utility power grid, such as the power lines that deliver electric current to residences and commercial buildings in addition to the conductive pathway 214. The conductive pathway 214 may receive the electric current that is supplied to the power conditioning circuit 216 and that powers the traction motors 412 from the utility power grid. As the rail vehicle 200 travels along the track 106 and the power conditioning circuit 216 is electrically coupled with the conductive pathway 214, the rail vehicle 200 may generate current that is supplied back to the utility power grid. For example, while the rail vehicle 200 may receive electric current from the conductive pathway 214 to power the traction motors 412, the engine 208 may be used to generate additional electric current that is fed back to the utility power grid via the power conditioning circuit 216. In another example, the rail vehicle 200 may create regenerated current from regenerative brakes. The regenerated current can be fed back to the utility power grid via the power conditioning circuit 216.

The utility company that supplies current to the conductive pathway 214 may provide financial incentives, such as rebates or discounts, for the purchase of current that is delivered to the rail vehicle 200 along the conductive pathway 214 for current that is supplied back to the utility power grid by the rail vehicle 200. If the cost of producing electric current from the alternator 400 is less expensive that the cost of consuming current from the conductive pathway 214 to power the traction motors 412, then the rail vehicle 200 may generate current and supply the current back to the utility power grid through the conductive pathway 214 to receive financial incentives from the utility company. Such financial incentives can reduce the cost of operating the rail vehicle 200.

Figure 6:
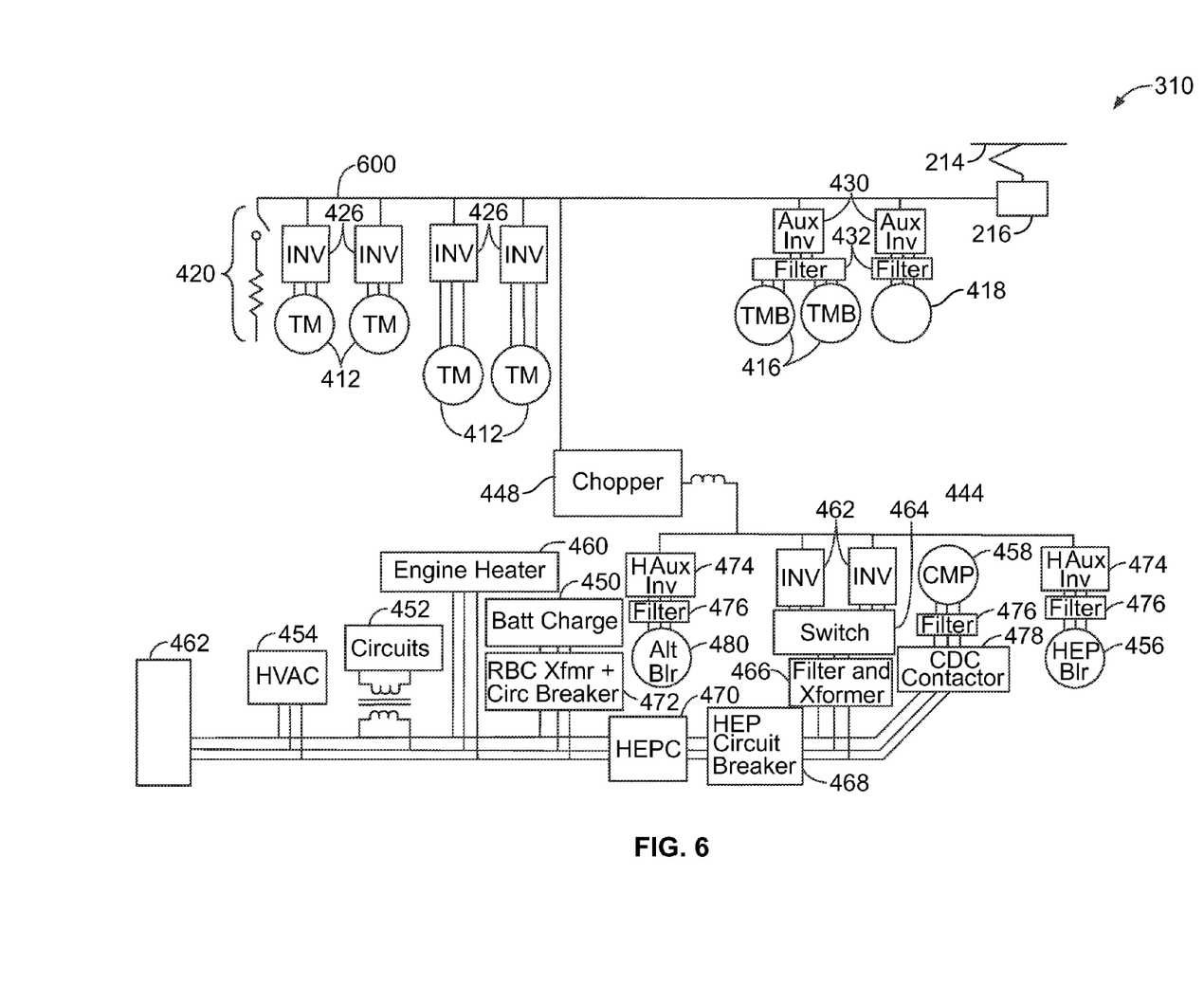
FIG. 6 is a diagram of a propulsion system of a rail vehicle shown in FIG. 3 in accordance with one embodiment.

FIG. 6 is a diagram of the propulsion system 310 of the rail vehicle 300 shown in FIG. 3 in accordance with one embodiment. The propulsion system 310 may be a modified version of the propulsion system 210 (shown in FIG. 2). For example, the propulsion system 210 may be adapted to be the propulsion system 310 shown in FIG. 3. One difference between the propulsion system 310 and the propulsion system 210 is that the propulsion system 310 may not power the traction motors 412 using fuel-based electric current generated based on movement of an engine/prime mover. For example, the propulsion system 310 may not have the engine 208 (shown in FIG. 2), the alternator 400 (shown in FIG. 4) that creates current based on movement of the engine 208, the rectifier 408 (shown in FIG. 4), the switch 428 (shown in FIG. 4), the fans 414 (shown in FIG. 4), and the like. Additionally, the propulsion system 310 may have fewer auxiliary inverters 430, filters 432, and the like. For example, by removing the fans 414, fewer auxiliary inverters 430 and filters 432 may be needed. The propulsion system 310 may obtain external electric current to power the traction motors 412 from the conductive pathway 214 by way of the power conditioning circuit 216.

The propulsion system 310 includes many of the same components as the tractive circuit 218 (shown in FIG. 2) of the propulsion system 210 (shown in FIG. 2). For example, the propulsion system 310 may include a conductive bus 600 that has one or more interconnected and electrically conductive pathways coupled with each other that supply electric current to various electric loads of the propulsion system 310. The electric loads may include propulsion electric loads that propel or assist in propelling the rail vehicle 300 (shown in FIG. 3), such as the traction motors 412, fans 414, motor blowers 416, and other electric loads 418. Alternatively, one or more of the propulsion electric loads may be removed from the propulsion system 310. For example, one or more of the inverters 430, filters 432, and/or fans 414 may be removed. Removing the inverters 430, filters 432, and fans 414 that are connected with each other may reduce the components and weight of the propulsion system 310 such that components of the power conditioning circuit 216 may be moved to a location inside the powered unit 302 (shown in FIG. 3). The propulsion electric loads of the propulsion system 310 described herein are not intended to be all encompassing or exclusive, as additional components may be included.

The propulsion system 310 includes the power conditioning circuit 216 described above. In one embodiment, the power conditioning circuit 216 may be disposed within the powered unit 302 (shown in FIG. 3). For example, in contrast to the propulsion system 210 (shown in FIG. 2), the propulsion system 310 may be disposed within the powered unit 302. External electric current is received from the conductive pathway 214 by the power conditioning circuit 216. The power conditioning circuit 216 supplies the external electric current to the bus 600. The external electric current is delivered along the bus 600 to the propulsion electric loads, such as the traction motors 412, to propel the rail vehicle 300 along the track 106 (shown in FIG. 1).

Some of the external electric current received from the conductive pathway 214 may be supplied to the chopper 448. The chopper 448 may then supply the external electric current to one or more non-propulsion electric loads of the propulsion system 310. For example, the chopper 448 may increase the voltage on the bus 600 prior to supplying the voltage to the non-propulsion electric loads, such as the battery charger 450, electric circuits 452, HVAC subsystem 454, blowers 456, 480, compressors 458 ("CMP"), engine heaters 460, and trailing unit non-propulsion loads 462.

As described above, the rail vehicle 100 (shown in FIG. 1) and/or the propulsion system 110 may be modified or adapted to evolve from a fuel-powered only configuration, where the current (used to power traction motors) is generated from movement of an engine, to a rail vehicle 200 and propulsion system 210 having a combination fuel and electric-powered configuration, where the current (used to power traction motors) is generated from movement of the engine and/or received from an external electric power source. The rail vehicle 200 and/or propulsion system 210 may be modified to evolve from the combination configuration to the rail vehicle 300 and propulsion system 310 having an electric-powered only configuration, where the current used to propel the rail vehicle 300 is obtained from the external electric power source.

Figure 7:
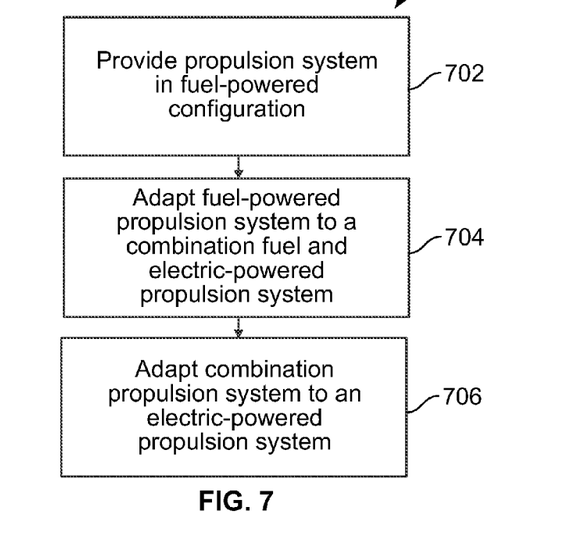
FIG. 7 is a flowchart of a method for migrating a propulsion system for a powered rail vehicle between different configurations in accordance with one embodiment.

FIG. 7 is a flowchart of a method 700 for migrating a propulsion system for a powered rail vehicle between different configurations in accordance with one embodiment. The method 700 may be used for adapting the fuel-powered propulsion system 110 (shown in FIG. 1) of the rail vehicle 100 (shown in FIG. 1) to the combination fuel- and electric-powered propulsion system 210 (shown in FIG. 2) of the rail vehicle 200 (shown in FIG. 2). In one embodiment, the method 700 also may adapt the combination propulsion system 210 to the electric-powered propulsion system 310 (shown in FIG. 3) of the rail vehicle 300 (shown in FIG. 3).

At 702, a propulsion system in a fuel-powered only configuration is provided. The propulsion system may be similar to the propulsion system 110 (shown in FIG. 1). For example, a propulsion system may be provided that includes a tractive circuit that is similar to the tractive circuit 218 (shown in FIG. 2), but that does not include the bus extension 406 (shown in FIG. 4) and does not couple with the power conditioning circuit 216 (shown in FIG. 2). The propulsion system provided at 702 may obtain all or substantially all of the electric current used to power the traction motors 412 (shown in FIG. 4) to propel the rail vehicle 100 from the alternator 400 (shown in FIG. 4) that is joined to the engine 108 (shown in FIG. 1) of the rail vehicle 100.

At 704, the propulsion system provided at 702 is adapted to a propulsion system in a combination fuel- and electric-powered configuration. For example, the propulsion system 110 (shown in FIG. 1) may be modified to the propulsion system 210 (shown in FIG. 2). As described above, the propulsion system 210 is capable of supplying current to power the traction motors 412 (shown in FIG. 4) from the alternator 400 (shown in FIG. 4) joined to the engine 208 (shown in FIG. 2) and/or from the power conditioning circuit 216 (shown in FIG. 2). The power conditioning circuit 216 receives the current from an external electric power source by way of the conductive pathway 214 (shown in FIG. 2). The propulsion system 210 may alternate between powering the traction motors 412 with fuel-based electric current from the alternator 400 and with external electric current from the power conditioning circuit 216 based on the availability of current from the external electric power source.

At 706, the propulsion system provided at 704 is adapted to a propulsion system in an electric-powered only configuration. The propulsion system 210 (shown in FIG. 2) may be modified to the propulsion system 310 (shown in FIG. 3). For example, the engine 208 (shown in FIG. 2) and alternator 400 (shown in FIG. 4) may be removed from the powered unit 202 (shown in FIG. 2). The power conditioning circuit 216 (shown in FIG. 2) may be moved from the trailing unit 212 (shown in FIG. 2) to the powered unit 202. In the electric-powered only configuration, the propulsion system 310 may power the traction motors 412 entirely with external electric current obtained from the external electric power source by way of the conductive pathway 214 (shown in FIG. 2).

Figure 8:
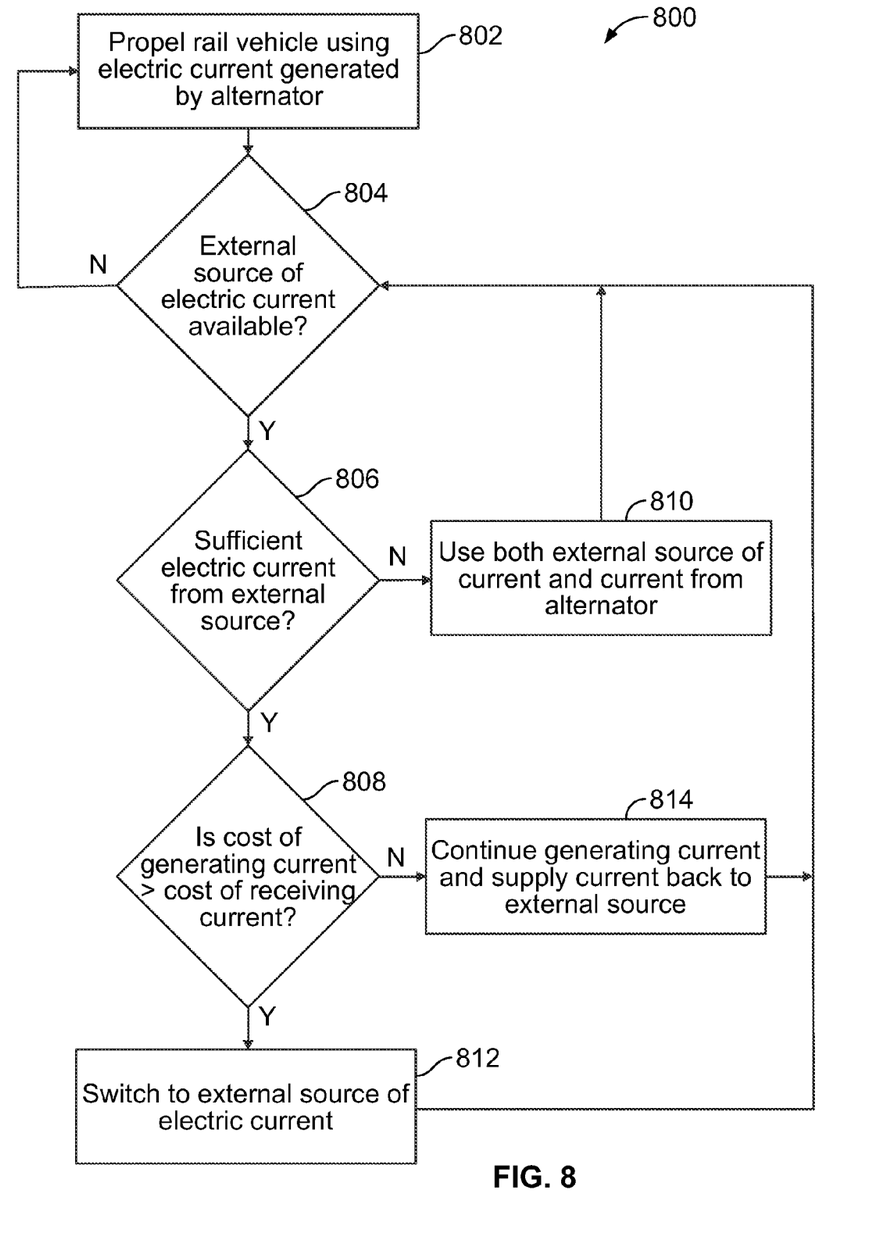
FIG. 8 is a flowchart of a method for switching among different sources of electric current to power a rail vehicle in accordance with one embodiment.

FIG. 8 is a flowchart of a method 800 for switching among different sources of electric current to power a rail vehicle in accordance with one embodiment. The method 800 may be used to operate the propulsion system 210 (shown in FIG. 2) of the rail vehicle 200 (shown in FIG. 2). For example, the method 800 may be used to switch between powering the propulsion system 210 with fuel-based electric current generated by the alternator 400 (shown in FIG. 4) and based on movement of the engine 208 (shown in FIG. 2) and powering the propulsion system 210 with external electric current obtained from an external electric power source, such as current obtained from the conductive pathway 214 (shown in FIG. 2).

At 802, the rail vehicle is propelled using fuel-based electric current generated by an alternator and based on movement of an engine. For example, the traction motors 412 (shown in FIG. 4) of the rail vehicle 200 (shown in FIG. 2) may be powered from current obtained from the alternator 400 and based on movement of the engine 208 (shown in FIG. 2).

At 804, a determination is made as to whether an external source of electric current is available. For example, a decision may be made as to whether the conductive pathway 214 (shown in FIG. 2) is near the rail vehicle 200 (shown in FIG. 2) such that the power conditioning circuit 216 (shown in FIG. 2) may couple with the conductive pathway 214 to receive external electric current. In one embodiment, an operator of the rail vehicle 200 may visually determine if the conductive pathway 214 is present. Alternatively, the rail vehicle 200 may include a sensor or logic device, such as a computer processor, that determines when the power conditioning circuit 216 receives external electric current from the conductive pathway 214 to determine if the conductive pathway 214 is near the rail vehicle 200.

If the external source of electric current is available, then the availability of the external source may indicate that the propulsion system 210 (shown in FIG. 2) of the rail vehicle 200 (shown in FIG. 2) may be powered by the electric current from the external source. As a result, flow of the method 800 proceeds to 806. Alternatively, if the external source of electric current is unavailable, then the absence of electric current from the external source may indicate that the propulsion system 210 of the rail vehicle 200 may need to continue being powered by fuel-based electric current generated based on movement of the engine 208 (shown in FIG. 2). As a result, flow of the method 800 returns to 802.

At 806, a determination is made as to whether the electric current received from the external source is sufficient to power the rail vehicle. For example, a decision is made as to whether the external electric current received by the power conditioning circuit 216 (shown in FIG. 2) is sufficient to power the propulsion and/or non-propulsion electric loads of the tractive circuit 218 (shown in FIG. 2). If the electric current from the external source is insufficient to power the rail vehicle 200, then the external current obtained by the power conditioning circuit 216 from the conductive pathway 214 (shown in FIG. 2) may be insufficient to propel the rail vehicle 200 and/or to power one or more other electric loads. As a result, flow of the method 800 continues to 810.

At 810, electric current from both the external source and from the alternator 400 (shown in FIG. 4) is used to power the rail vehicle 200 (shown in FIG. 2). For example, if the electric current from the external source alone is insufficient to power the rail vehicle 200, then the current obtained from the alternator 400 may be used to augment the electric current from the external source. Flow of the method 800 may return to 804, where another determination is made as to whether the external source of electric current continues to be available to power or assist in powering the rail vehicle 200.

Alternatively, if the electric current from the external source is sufficient to power the rail vehicle 200 without additional current being generated by the alternator 400 (shown in FIG. 4), then the current from the external source may be sufficient to propel the rail vehicle 200 and/or power other electric loads without additional electric current being provided by the alternator 400 (shown in FIG. 4) based on movement of the engine 208 (shown in FIG. 2). As a result, flow of the method 800 proceeds from 806 to 808.

At 808, the cost of generating current based on movement of the engine 208 (shown in FIG. 2) is compared to the cost of obtaining current from the external source. For example, the cost of fuel consumed by the engine 208 to generate current for powering the rail vehicle 200 (shown in FIG. 2) may be compared to the cost of purchasing current from the external source. If the cost of generating the current using the engine 208 is greater than the cost of purchasing the current from the external source, then the expense of operating the rail vehicle 200 may be reduced by powering the rail vehicle using current from the external source and not using the engine 208 to generate current. As a result, flow of the method 800 proceeds to 812.

At 812, the rail vehicle 200 (shown in FIG. 2) switches to using the electric current received from the external source. For example, the rail vehicle 200 may deactivate the engine 208 (shown in FIG. 2) and power the propulsion and non-propulsion electric loads using the electric current obtained by the power conditioning circuit 216 (shown in FIG. 2) from the conductive pathway 214 (shown in FIG. 2). Flow of the method 800 may return to 804 where another determination is made as to whether the external source of electric current continues to be available to power or assist in powering the rail vehicle 200.

On the other hand, if the cost of generating electric current based on movement of the engine 208 (shown in FIG. 2) does not exceed the cost of receiving or purchasing electric current from the external source, then the expense of operating the rail vehicle 200 (shown in FIG. 2) may be reduced by producing electric current using the engine 208 and conveying the electric current back to the external source. For example, utility power companies that are external sources of electric current may provide financial incentives such as rebates or discounts for current that is provided to the utility power companies. As a result, flow of the method 800 proceeds to 814.

At 814, the rail vehicle 200 (shown in FIG. 2) generates fuel-based electric current based on movement of the engine 208 (shown in FIG. 2) and supplies at least some of the electric current back to the external source via the power conditioning circuit 216 (shown in FIG. 2). For example, the rail vehicle 200 may be powered by current received from the conductive pathway 214 (shown in FIG. 2) while the alternator 400 (shown in FIG. 4) continues to generate current based on movement of the engine 208. The current generated by the alternator 400 may be fed back to the external source by way of the power conditioning circuit 216 and the conductive pathway 214. Flow of the method 800 may return to 804 where another determination is made as to whether the external source of electric current continues to be available to power or assist in powering the rail vehicle 200.

In accordance with one embodiment, a propulsion system for a powered rail vehicle is provided that includes: a fuel engine disposed in the powered rail vehicle; an alternator coupled with and driven by the engine to produce a fuel-based electric current; and a tractive circuit including a traction motor and a conductive bus coupled with the alternator, where the conductive bus is configured to couple with a power conditioning circuit to receive an external electric current from an external electric power source via the power conditioning circuit, the tractive circuit has a fuel-powered only configuration, a fuel- and electric-powered configuration, and an electric-powered only configuration. The tractive circuit supplies the traction motor with the fuel-based electric current in the fuel-powered only configuration, with the fuel-based electric current or the external electric current in the fuel- and electric-powered configuration, and with the external electric current in the electric-powered only configuration.

In another aspect, the tractive circuit alternates between supplying the fuel-based electric current to the traction motor from the alternator and supplying the external electric current to the traction motor from the external electric power source when the tractive circuit is in the fuel- and electric-powered configuration.

In another aspect, the tractive circuit powers the traction motor without the external electric current from the external electric power source in the fuel-powered only configuration.

In another aspect, the tractive circuit powers the traction motor without the fuel-based electric current from the alternator in the electric-powered only configuration.

In another aspect, the tractive circuit is adapted to augment the fuel-based electric current or the external electric current supplied to the traction motor with another of the fuel-based electric current or the external electric current when the tractive circuit is in the fuel- and electric-powered configuration.

In another aspect, the power conditioning circuit is disposed outside of the powered rail vehicle.

In another aspect, the tractive circuit changes from the fuel-powered only configuration to the fuel- and electric-powered configuration by coupling the conductive bus with the power conditioning circuit located in a trailing unit that is coupled with and propelled along a track by the powered rail unit.

In another aspect, the tractive circuit receives the external electric current via the power conditioning circuit from at least one of a catenary extending along a track or an electrified rail of the track.

In another aspect, the tractive circuit is configured to be electrically coupled with a utility power grid by the power conditioning circuit and supply at least some of the fuel-based electric current to the utility power grid.

Another embodiment provided herein describes a method for adapting a propulsion system for a powered rail vehicle between different configurations, the method comprising: in a fuel-powered only configuration of the propulsion system, providing a tractive circuit electrically coupling a traction motor of the powered rail vehicle with an alternator coupled to and driven by a fuel engine of the powered rail vehicle, the alternator supplying a fuel-based electric current to the tractive circuit; adapting the propulsion system from the fuel-powered only configuration to a fuel- and electric-powered configuration by coupling the tractive circuit with a power conditioning circuit that is configured to couple with an external electric power source, the power conditioning circuit supplying an external electric current from the external electric power source to the tractive circuit; and supplying the traction motor with the fuel-based electric current from the alternator in the fuel-powered only configuration of the powered rail vehicle and with the external electric current from the external electric power source in the fuel- and electric-powered configuration of the propulsion system.

In another aspect, the method also includes adapting the propulsion system from the fuel- and electric-powered configuration to an electric-powered only configuration by decoupling the tractive circuit from the alternator; and in the electric-powered only configuration of the propulsion system, supplying the traction motor with the external electric current and without the fuel-based electric current.

In another aspect, the supplying operation comprises powering the traction motor without the external electric current from the external electric power source in the fuel-powered only configuration of the propulsion system.

In another aspect, the supplying operation includes powering the traction motor without the fuel-based electric current from the alternator in the electric-powered only configuration of the propulsion system.

In another aspect, in the fuel- and electric-powered configuration of the propulsion system, the supplying operation comprises alternating between powering the traction motor with the fuel-based electric current from the alternator and powering the traction motor with the external electric current from the external electric power source.

In another aspect, in the fuel- and electric-powered configuration of the propulsion system, the supplying operation comprises augmenting the fuel-based electric current or the external electric current supplied to the traction motor with another of the fuel-based electric current or the external electric current.

In another aspect, the adapting operation comprises electrically coupling the tractive circuit with the power conditioning circuit disposed in a trailing unit that is coupled with and propelled along a track by the powered rail unit.

In another aspect, the method also includes, in the fuel- and electric-powered configuration of the propulsion system, electrically coupling the tractive circuit with a utility power grid by the power conditioning circuit and supplying at least some of the fuel-based electric current to the utility power grid.

Another embodiment provides a propulsion system for a powered rail vehicle. The propulsion system includes a fuel engine disposed in the powered rail vehicle; an alternator coupled with and driven by the engine to produce a fuel-based electric current; and a conductive bus coupled with the alternator, the conductive bus configured to couple with a power conditioning circuit to receive an external electric current from an external electric power source via the power conditioning circuit, wherein the conductive bus supplies the fuel-based electric current or the external electric current to a traction motor to propel the powered rail vehicle along a track.

In another aspect, the conductive bus is configured to alternate between supplying the fuel-based electric current to the traction motor from the alternator and supplying the external electric current to the traction motor from the external electric power source based on availability of the external electric current.

In another aspect, the conductive bus concurrently couples the alternator and the power conditioning circuit with the traction motor.

In another aspect, the conductive bus receives the external electric current via the power conditioning circuit from at least one of a catenary extending along the track or a powered rail of the track.

In another aspect, the conductive bus is configured to augment power supplied to the traction motor by concurrently supplying the fuel-based electric current and the external electric current to the traction motor.

In another aspect, the conductive bus is configured to be electrically coupled with a utility power grid by the power conditioning circuit and supplies at least some of the fuel-based electric current to the utility power grid. Another embodiment relates to a method for reconfiguring a powered rail vehicle. The powered rail vehicle includes a propulsion system having a tractive circuit with a traction motor. The method comprises adapting the propulsion system of the powered rail vehicle from a fuel-powered only configuration of the propulsion system to a fuel- and electric-powered configuration. In the fuel-powered only configuration, the traction motor is powered using only fuel-based electric current that is at least partly provided to the traction motor by an alternator coupled to and driven by a fuel engine of the powered rail vehicle. (Fuel-based electric current could also be provided, in effect, from regenerative or dynamic braking, that is, electric current generated by the alternator is converted to kinetic energy of the rail vehicle and then back to electric current.) In the fuel- and electric-powered configuration, the traction motor is powered using both the fuel-based electric current and external electric current received from an external electric power source. The propulsion system is adapted (at least in part) by coupling the tractive circuit with a power conditioning circuit that is configured to couple with the external electric power source. The power conditioning circuit is configured to supply the external electric current from the external electric power source to the tractive circuit.

In another embodiment, the method for reconfiguring the powered rail vehicle further comprises adapting the propulsion system from the fuel- and electric-powered configuration to an electric-powered only configuration, by decoupling the tractive circuit from the alternator. In the electric-powered only configuration of the propulsion system, the traction motor is powered using only the external electric current.

In another embodiment of the method for reconfiguring the powered rail vehicle, each configuration of the propulsion system (fuel-powered only configuration, fuel- and electric-powered configuration, electric-powered only configuration) is semi-permanent, meaning that when the rail vehicle is in any particular configuration, it is not possible to switch between different configurations when the rail vehicle is in use and traveling along a track. Instead, to switch between different configurations, the rail vehicle is taken out of service and modified appropriately, as described herein.

In another embodiment of the method for reconfiguring the powered rail vehicle, in the fuel-powered only configuration, the rail vehicle lacks equipment for receiving external electric current (for powering traction motors) as the rail vehicle moves along a track. (This does not preclude the possibility of the rail vehicle including a "plug in" feature for receiving electricity while the rail vehicle is parked/stationary, e.g., for powering life support and other non-traction systems.) In the fuel-powered only configuration, the rail vehicle may include a bus extension 406 connected to a conductive bus 410 portion of the tractive circuit, to facilitate eventual adaptation to the fuel- and electric-powered configuration. For adapting the rail vehicle to the fuel- and electric-powered configuration, the rail vehicle is provided with equipment for receiving external electric current (for powering traction motors) as the rail vehicle moves along a track, while retaining the ability to generate fuel-based electric current. For this purpose, the tractive circuit of the rail vehicle is coupled with a power conditioning circuit that is configured to couple with an external electric power source. Coupling the tractive circuit to the power conditioning circuit may be facilitated by the bus extension 406, if present. Additionally, for adapting the rail vehicle to the fuel- and electric-powered configuration, a control system of the rail vehicle may be modified for controlling providing both fuel-based electric current and external electric current to traction motor(s) of the rail vehicle. (For example, the control system may be modified for carrying out a process as summarized in FIG. 8 and associated description.) For adapting the rail vehicle to the electric-powered only configuration, the rail vehicle is modified so that it can no longer generate fuel-based electric current. This may include decoupling an alternator of the rail vehicle from the conductive bus, removing the engine and alternator, etc. In one embodiment, the engine and/or alternator are received in the rail vehicle in a manner that facilitates their eventual easy removal from the rail vehicle.

In an embodiment, a power conditioning circuit is located in a trailing unit. That is, a rail vehicle (e.g., train) includes a powered unit and a trailing unit connected to the powered unit (for traveling along a track together). The powered unit houses a tractive circuit, and the trailing unit house the power conditioning circuit, for interfacing the tractive circuit with an external electric power source. In another embodiment, the power conditioning circuit is instead housed in the powered unit.

In any of the embodiments set forth herein, the power conditioning circuit of a rail vehicle may be configured to receive an external electric current from an external electric power source as the rail vehicle moves along a track at relatively high operating speeds (meaning speeds in excess of 30 kph).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosed subject matter without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the described subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the described subject matter, including the best mode, and also to enable any person skilled in the art to practice the embodiments of subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A propulsion system of a powered rail vehicle comprising:
   a fuel engine disposed in the powered rail vehicle;
   an alternator coupled with and driven by the engine to produce a fuel-based electric current; and
   a tractive circuit including a traction motor and a conductive bus coupled with the alternator, the conductive bus configured to couple with a power conditioning circuit to receive an external electric current from an external electric power source via the power conditioning circuit, wherein the tractive circuit has a fuel-powered only configuration, a fuel- and electric-powered configuration, and an electric-powered only configuration, the tractive circuit supplying the traction motor with the fuel-based electric current in the fuel-powered only configuration, the tractive circuit supplying the traction motor with at least one of the fuel-based electric current or the external electric current in the fuel- and electric-powered configuration, and the tractive circuit supplying the traction motor with the external electric current in the electric-powered only configuration, and
   wherein the tractive circuit is configured to be electrically coupled with a utility power grid by the power conditioning circuit and to supply at least some of the fuel-based electric current to the utility power grid.

2. The propulsion system of claim 1, wherein the tractive circuit alternates between supplying the fuel-based electric current to the traction motor from the alternator and supplying the external electric current to the traction motor from the external electric power source when the tractive circuit is in the fuel- and electric-powered configuration.

3. The propulsion system of claim 1, wherein the tractive circuit powers the traction motor without the external electric current from the external electric power source in the fuel-powered only configuration.

4. The propulsion system of claim 1, wherein the tractive circuit powers the traction motor without the fuel-based electric current from the alternator in the electric-powered only configuration.

5. The propulsion system of claim 1, wherein the tractive circuit is adapted to augment the fuel-based electric current or the external electric current supplied to the traction motor with the other of the fuel-based electric current or the external electric current when the tractive circuit is in the fuel- and electric-powered configuration.

6. The propulsion system of claim 1, wherein the tractive circuit changes from the fuel-powered only configuration to the fuel- and electric-powered configuration by coupling the conductive bus with the power conditioning circuit located in a trailing unit that is coupled with and propelled along a track by the powered rail vehicle.

7. The propulsion system of claim 1, wherein the tractive circuit receives the external electric current via the power conditioning circuit from at least one of a catenary extending along a track or an electrified rail of the track.

8. The propulsion system of claim 1, wherein the tractive circuit is configured to directly supply the traction motor with the external electric current in the electric-powered only configuration without first storing the external electric current in a battery.

9. A propulsion system of a powered rail vehicle comprising:
   a fuel engine disposed in the powered rail vehicle;
   an alternator coupled with and driven by the engine to produce a fuel-based electric current; and
   a tractive circuit including a traction motor and a conductive bus coupled with the alternator, the conductive bus configured to couple with a power conditioning circuit to receive an external electric current from an external electric power source via the power conditioning circuit, wherein the tractive circuit has a fuel-powered only configuration, a fuel- and electric-powered configuration, and an electric-powered only configuration, the tractive circuit supplying the traction motor with the fuel-based electric current in the fuel-powered only configuration, the tractive circuit supplying the traction motor with at least one of the fuel-based electric current or the external electric current in the fuel- and electric-powered configuration, and the tractive circuit supplying the traction motor with the external electric current in the electric-powered only configuration, and
   wherein the power conditioning circuit is disposed outside of the powered rail vehicle.

10. A method for reconfiguring a powered rail vehicle, the method comprising:
    adapting a propulsion system of the powered rail vehicle from a fuel-powered only configuration of the propulsion system to a fuel- and electric-powered configuration, the propulsion system having a tractive circuit with a traction motor, wherein in the fuel-powered only configuration the traction motor is powered using only fuel-based electric current at least partly provided to the traction motor by an alternator coupled to and driven by a fuel engine of the powered rail vehicle, and wherein in the fuel- and electric-powered configuration the traction motor is powered using both the fuel-based electric current and external electric current received from an external electric power source;
    wherein the propulsion system is adapted at least in part by coupling the tractive circuit with a power conditioning circuit that is configured to couple with the external electric power source, the power conditioning circuit configured to supply the external electric current from the external electric power source to the tractive circuit, and
    wherein adapting the propulsion system comprises electrically coupling the tractive circuit with the power conditioning circuit disposed in a trailing unit that is coupled with and propelled along a track by the powered rail vehicle.

11. The method of claim 10, further comprising, in the fuel- and electric-powered configuration of the propulsion system, alternating between powering the traction motor with the fuel-based electric current from the alternator and powering the traction motor with the external electric current from the external electric power source.

12. The method of claim 10, further comprising, in the fuel- and electric-powered configuration of the propulsion system, augmenting the fuel-based electric current or the external electric current supplied to the traction motor with the other of the fuel-based electric current or the external electric current.

13. A method for reconfiguring a powered rail vehicle, the method comprising:
    adapting a propulsion system of the powered rail vehicle from a fuel-powered only configuration of the propulsion system to a fuel- and electric-powered configuration, the propulsion system having a tractive circuit with a traction motor, wherein in the fuel-powered only configuration the traction motor is powered using only fuel-based electric current at least partly provided to the traction motor by an alternator coupled to and driven by a fuel engine of the powered rail vehicle, and wherein in the fuel- and electric-powered configuration the traction motor is powered using both the fuel-based electric current and external electric current received from an external electric power source;
    wherein the propulsion system is adapted at least in part by coupling the tractive circuit with a power conditioning circuit that is configured to couple with the external electric power source, the power conditioning circuit configured to supply the external electric current from the external electric power source to the tractive circuit; and
    adapting the propulsion system from the fuel- and electric-powered configuration to an electric-powered only configuration by decoupling the tractive circuit from the alternator, wherein in the electric-powered only configuration of the propulsion system the traction motor is powered using only the external electric current.

14. The method of claim 13, further comprising powering the traction motor in the electric-powered only configuration by directly supplying the external electric current to the traction motor without first storing the external electric current in a battery.

15. A propulsion system of a powered rail vehicle, the system comprising:
    a fuel engine disposed in the powered rail vehicle;

an alternator coupled with and driven by the engine to produce a fuel-based electric current; and a conductive bus coupled with the alternator, the conductive bus configured to couple with a power conditioning circuit to receive an external electric current from an external electric power source via the power conditioning circuit, wherein the conductive bus supplies at least one of the fuel-based electric current or the external electric current to a traction motor to propel the powered rail vehicle along a track, and wherein the conductive bus is configured to be electrically coupled with a utility power grid by the power conditioning circuit and supplies at least some of the fuel-based electric current to the utility power grid.

16. The propulsion system of claim 15, wherein the conductive bus is configured to alternate between supplying the fuel-based electric current to the traction motor from the alternator and supplying the external electric current to the traction motor from the external electric power source based on availability of the external electric current.

17. The propulsion system of claim 15, wherein the conductive bus concurrently couples the alternator and the power conditioning circuit with the traction motor.

18. The propulsion system of claim 15, wherein the conductive bus receives the external electric current via the power conditioning circuit from at least one of a catenary extending along the track or a powered rail of the track.

19. The propulsion system of claim 15, wherein the conductive bus is configured to augment power supplied to the traction motor by concurrently supplying the fuel-based electric current and the external electric current to the traction motor.

* * * * *